US009464591B2

(12) United States Patent
Worthington et al.

(10) Patent No.: US 9,464,591 B2
(45) Date of Patent: *Oct. 11, 2016

(54) CYLINDER LINER SEAL ARRANGEMENT AND METHOD OF PROVIDING THE SAME

(71) Applicant: Cummins Intellectual Properties, Inc., Minneapolis, MN (US)

(72) Inventors: Joseph Worthington, Seymour, IN (US); Terry M. Shaw, Columbus, IN (US); David Genter, Columbus, IN (US); Dan E. Richardson, Columbus, IN (US); Ian McGiffen, Scipio, IN (US); Mark G. Luehrmann, Hope, IN (US); Keith Gunter, Long Buckby (GB)

(73) Assignee: Cummins Intellectual Properties, Inc., Minneapolis, MN (US)

( * ) Notice: Subject to any disclaimer, the term of this patent is extended or adjusted under 35 U.S.C. 154(b) by 4 days.

This patent is subject to a terminal disclaimer.

(21) Appl. No.: 14/100,324

(22) Filed: Dec. 9, 2013

(65) Prior Publication Data
US 2014/0090619 A1 Apr. 3, 2014

Related U.S. Application Data

(63) Continuation of application No. 13/197,197, filed on Aug. 3, 2011, now Pat. No. 8,601,995.

(51) Int. Cl.
*F02F 1/00* (2006.01)
*F02F 11/00* (2006.01)
(Continued)

(52) U.S. Cl.
CPC ............... *F02F 1/004* (2013.01); *B23P 6/02* (2013.01); *F02F 11/002* (2013.01); *F16J 10/04* (2013.01); *Y10T 29/49233* (2015.01); *Y10T 29/49272* (2015.01)

(58) Field of Classification Search
CPC ............. F02F 1/10; F02F 1/16; F02F 1/004; F02F 11/002; F01P 2003/021; F16J 10/04; B23P 6/02; Y10T 29/49272; Y10T 29/49233
USPC ............ 123/193.2, 193.3, 668, 41.83, 41.84, 123/41.72
See application file for complete search history.

(56) References Cited

U.S. PATENT DOCUMENTS 2,783,748 A * 3/1957 Brenneke .................. 123/41.83
3,156,224 A 11/1964 Winkler
(Continued)

FOREIGN PATENT DOCUMENTS

CN 201723700 1/2011

OTHER PUBLICATIONS

International Search Report and Written Opinion of the International Searhing Authority in related patent application PCT/US2013/047672, Oct. 15, 2013, 12 pages.
(Continued)

*Primary Examiner* — Marguerite McMahon
(74) *Attorney, Agent, or Firm* — Faegre Baker Daniels LLP

(57) ABSTRACT

A cylinder liner sealing arrangement for an internal combustion engine including a cylinder block having cylinder bores, a cylinder head, a cylinder liner within each cylinder bore and a circumferential cut-out formed in the upper and outer surfaces of the cylinder liner. A circular sealing ring is positioned in the circumferential cut-out with the sealing ring contacting at least the cylinder block and the cylinder liner to form a coolant seal therebetween. The sealing ring includes a seal enhancing configuration formed on at least an outer circumferential surface of the sealing ring with the seal enhancing configuration including at least one of an arcuate portion of a "D" ring seal or a plurality of circumferentially extending ribs. Replacing the cylinder liner seal includes removing the cylinder head while maintaining the position of the cylinder liner within the respective cylinder bore, removing an upper liner seal from within the circumferential cut-out while maintaining the position of the cylinder liner within the cylinder bore, positioning a replacement sealing ring in the circumferential cut-out while maintaining the position of the cylinder liner within the cylinder bore and replacing the cylinder head on the cylinder block of the engine.

16 Claims, 10 Drawing Sheets

(51) Int. Cl.
   *F16J 10/04*      (2006.01)
   *B23P 6/02*       (2006.01)

(56) References Cited

U.S. PATENT DOCUMENTS

| | | | |
|---|---|---|---|
| 3,853,099 A * | 12/1974 | Feather et al. | ......... 123/41.82 R |
| 4,244,330 A | 1/1981 | Baugh et al. | |
| 4,273,835 A | 6/1981 | Higuchi | |
| 4,455,973 A | 6/1984 | Stadler et al. | |
| 4,524,982 A | 6/1985 | Hertz, Jr. | |
| 4,530,323 A | 7/1985 | Wakasa | |
| 4,616,603 A | 10/1986 | Kubis et al. | |
| 4,848,212 A | 7/1989 | Kawano et al. | |
| 5,033,426 A | 7/1991 | Reichenbach et al. | |
| 5,062,393 A | 11/1991 | Smith et al. | |
| 5,094,193 A | 3/1992 | Yoshikawa | |
| 5,112,066 A | 5/1992 | Remmerfelt | |
| 5,326,034 A | 7/1994 | Peters | |
| 5,711,449 A | 1/1998 | Arn | |
| 5,775,272 A | 7/1998 | Matsunaga et al. | |
| 5,819,704 A | 10/1998 | Tarr et al. | |
| 5,868,107 A | 2/1999 | Betsch et al. | |
| 5,979,374 A | 11/1999 | Jackson | |
| 6,036,194 A | 3/2000 | Stamper | |
| 6,116,198 A * | 9/2000 | Kirtley et al. | ............. 123/41.84 |
| 6,145,481 A | 11/2000 | Bock et al. | |
| 6,164,260 A | 12/2000 | Bock | |
| 6,276,338 B1 | 8/2001 | Kato et al. | |
| 6,357,400 B1 * | 3/2002 | Bedwell et al. | ........... 123/41.84 |
| 6,746,021 B2 | 6/2004 | Breen | |
| 7,128,028 B2 | 10/2006 | Paul et al. | |
| 2003/0019443 A1 | 1/2003 | Thompson | |
| 2003/0221654 A1 | 12/2003 | Kueltzo et al. | |
| 2005/0172917 A1 | 8/2005 | Betsch et al. | |
| 2007/0227475 A1 * | 10/2007 | Hiramitsu et al. | ......... 123/41.72 |
| 2009/0114173 A1 | 5/2009 | Haubner et al. | |
| 2011/0058959 A1 | 3/2011 | Whaley et al. | |

OTHER PUBLICATIONS

International Search Report and Written Opinion of the International Searching Authority dated Oct. 25, 2012 from corresponding International Application No. PCT/US2012/049049.

* cited by examiner

CYLINDER LINER SEAL ARRANGEMENT AND METHOD OF PROVIDING THE SAME

CROSS-REFERENCE TO RELATED APPLICATIONS

This application is a continuation of U.S. patent application Ser. No. 13/197,197, filed on Aug. 3, 2011, issued on Dec. 10, 2013 as U.S. Pat. No. 8,601,995. The disclosure of U.S. patent application Ser. No. 13/197,197 is expressly incorporated by reference herein in its entirety.

TECHNICAL FIELD

The present invention generally relates to a cylinder liner seal of an internal combustion engine. More particularly, the present invention relates to a press-in-place and easily maintained cylinder liner seal for preventing the passage of coolant at the joint between the cylinder block and cylinder liner and a method of providing and replacing such seal.

BACKGROUND

Incorporation of replaceable cylinder liners in the design of an internal combustion engine provides numerous advantages to the manufacture and use of such an engine. In addition to the obvious benefit of allowing such liners to be replaced during overhaul of the engine without replacement of the entire cylinder block, cylinder liners eliminate the necessity to scrap the entire block during manufacture or use should the inside surface of one cylinder be improperly machined or otherwise damaged. Despite this and other advantages, numerous problems attend the use of replaceable cylinder liners as is exemplified by the great variety of liner designs previously used by engine manufacturers. Further, seals are prevalent throughout many diesel engine platforms, or configurations, and it is often desirable, or necessary, to maintain separation between fluids within the engine and the environment. This is particularly the case between combustion gasses within the cylinder liner and coolant surrounding the cylinder liner. With conventional cylinder liner configurations, a combustion gas seal is provided to prevent combustion gasses from passing from the combustion chamber between the cylinder liner and cylinder head. Should this seal fail, the combustion gasses may mix with the coolant of the coolant jacket surrounding the cylinder liner. A combustion gas seal of this type for providing a combustion gas seal between the top surface of the cylinder liner and the cylinder head is set forth in U.S. Pat. No. 6,036,194 issued to Stamper and assigned to the assignee of the subject invention.

Presently, both wet and dry type cylinder liners incorporate either a mid-stop arrangement wherein the cylinder liner is substantially supported within the block mid-way along the length of the cylinder liner or a top stop wherein the cylinder liner is supported about an upper periphery thereof. U.S. Pat. No. 3,403,661 discloses a liner design for use in an engine block having a counter bore cylinder cavity wherein the liner includes a radially outwardly extending flange designed to be seated in the counter bore so that the liner may be easily clamped into place by the engine cylinder head. In order to provide for coolant flow around the liner, a seal is provided between the engine block and a lower portion of the liner spaced from the top flange. Due to vibration and thermally induced size changes of the liner, relative motion occurs in the seal area of a type which may destroy conventionally known seals.

It is known in the industry to employ mechanical means to obtain a seal between the cylinder liner and cylinder block to prevent the passage of coolant at the joint between the cylinder block and the cylinder liner. One such approach is set forth in U.S. Pat. No. 4,244,330 issued to Baugh et al. and assigned to the assignee of the subject invention. Therein, the cylinder liner for an internal combustion engine includes a cylindrical hollow body having a press-fitted upper end and a stop located intermediate the liner ends for engaging an engine block liner stop to provide upper and lower seals for a coolant passage. The outside surfaces of the liner adjacent the press-fitted upper end and the stop are formed to permit a settable plastic material to be used between the liner and engine block to assist in forming the coolant seal and to provide radial support of the cylinder liner.

Similarly, U.S. Pat. No. 5,979,374 provides a replaceable cylinder liner for a cylinder cavity within a cylinder block of an internal combustion engine having a liner stop positioned within the cavity at a point intermediate the extremes of travel of a piston disposed for reciprocating travel within the cylinder cavity. The liner includes a hollow cylinder body having an inner end portion and an outer end portion with the outer end portion having a piston engaging inside surface for guiding the piston during travel and a top end face for forming a combustion gas seal with an engine head. The liner further includes a mechanism for reinforcing and securing the liner in place within the cylinder cavity and for resisting deforming forces resulting from fuel combustion within the outer end portion and for compressively and frictionally engaging an inside surface of the cylinder cavity when pressed therein. The reinforcing and securing mechanism includes an end boss adjacent an outer end of the outer end portion, an outer diameter of such end boss being slightly greater than an inside diameter of corresponding portions of the cylinder cavity into which the end boss is press fitted. The replaceable liner further includes a liner support for axially supporting the hollow cylindrical body within the cylinder cavity with the liner support including a liner stop engaging surface for engaging the liner stop when the liner is placed within the cylinder cavity.

At an outermost end of the outer end portion of the liner is the end boss which is formed on an outer surface of the liner for reinforcing and primarily for frictionally engaging the inside surface of the cylinder cavity to form a coolant seal and for resisting the deforming forces resulting from fuel combustion within the hollow cylindrical body. Particularly, the end boss prevents radial movement of the outer end portion of the cylinder liner while permitting limited axial movement of the outer end portion within the liner receiving cavity by forming a radial press fit with the inside surface of the liner receiving cavity by compressively and frictionally engaging the inside surface of such cavity when pressed therein. Formed in an outer surface of the end boss are one or more recesses for receiving one or more o-ring type sealing members which provide a coolant seal between the end boss and the adjacent cylinder block. During routine maintenance of in the event of an engine overhaul in order to replace one or more of the o-ring type sealing members, it is necessary to undertake the removal of each cylinder liner to access the o-ring seal.

SUMMARY

This disclosure provides a cylinder liner sealing arrangement for an internal combustion engine including a cylinder block having cylinder bores, a cylinder head, a cylinder liner within each cylinder bore and a circumferential cut-out formed in the upper and outer surfaces of the cylinder liner. A sealing ring is positioned in the circumferential cut-out with the sealing ring contacting at least the cylinder block and the cylinder liner to form a coolant seal therebetween. The sealing ring comprises a metallic core. In some embodiments, the sealing ring includes a seal enhancing configuration formed on at least an outer circumferential surface of the sealing ring. The circumferential cut-out includes a first sidewall formed in the cylindrical upper outer surface of the cylinder liner and a radially extending bottom wall extending from the first side wall toward the cylinder block while an upper inner surface of the cylinder bore forms a second sidewall.

Replacing the cylinder liner seal includes removing the cylinder head while maintaining the position of the cylinder liner within the respective cylinder bore, removing an upper liner seal from within a circumferential cut-out formed in the cylinder liner while maintaining the position of the cylinder liner within the cylinder bore, positioning a replacement sealing ring in the circumferential cut-out while continuing to maintain the position of the cylinder liner within the cylinder bore and subsequently replacing and securing the cylinder head on the cylinder block of the engine. When positioning the a replacement sealing ring in the circumferential cut-out while maintaining the position of the cylinder liner within the respective bore, contact of the replacement cylinder liner seal with the first sidewall and the second sidewall should be determined.

In some embodiments, the cylinder liner seal includes a plurality of circumferentially extending ribs. The plurality of circumferentially extending ribs may be formed in at least an outer circumferential surface of the cylinder liner seal. The plurality of ribs are positioned to be in contact with the second sidewall.

In some embodiments, the cylinder liner seal is formed of an elastomeric material. Exemplary elastomeric materials include a high temperature coolant resistant elastomeric material, tetrafluorethylene-propylene and peroxide cured fluorocarbon.

DETAILED DESCRIPTION OF THE INVENTION

As noted above, seals are often provided between respective cylinder liners and cylinder blocks in order to maintain liner coolant provided between the cylinder liner and cylinder block from passing between the cylinder liner and cylinder block and mixing with combustion gases. These seals are generally formed of an elastomer material which over time may degrade to a point where it is necessary to replace one or more of the liner seals provided at the interface between the cylinder block and cylinder liner. In doing so, respective cylinder liners are removed, the worn or degraded liner seals removed from one or more circumferential grooves formed in an outer surface of the cylinder liner, new liner seals are positioned in each of the respective grooves and the cylinder liner is returned to and positioned in the respective cylinder bore of the cylinder block. The present inventors have determined that such a process is cumbersome and inefficient from a cost perspective, results in extensive down time in the operation of the engine and oftentimes results in the liner seals being damaged when the cylinder liners, including the new seals, are replaced in their respective cylinder bore.

Currently, beads or graphite coatings are used to seal the joint between the cylinder head and cylinder block of an internal combustion engine. Particularly, one means for achieving a more efficient system is to provide the cylinder head gasket with a mechanism for providing a seal between the coolant chamber formed between the cylinder block and liner and the combustion chamber in order to prevent mixture of the coolant and combustion gases; however, the inventors have determined that such an overall sealing arrangement fails to meet the need for maintaining the coolant within the coolant chambers. This is particularly the case with natural gas engines. With such engines, it has been determined that there is a need to seal the block and liner joint from potential leaks while having a cylinder head gasket that is free to allow excess gases to escape during a natural gas intake manifold over-pressurization event. Therefore, the present inventors have recognized a need to reduce the cost of replacing cylinder liner seals, reducing the down time of the engine, minimizing inadvertent damage to the cylinder liner seals during their replacement and permitting the excess gases to escape from the cylinder head gasket during a natural gas intake manifold over-pressurization while preventing the mixture of such gases with the engine coolant. The inventors have also found that it would be beneficial to enable a technician to readily replace the cylinder liner seals during routine maintenance when the cylinder head is removed rather than wait until an actual leak occurs, requiring an extensive overhaul of the engine.

Figure 1:
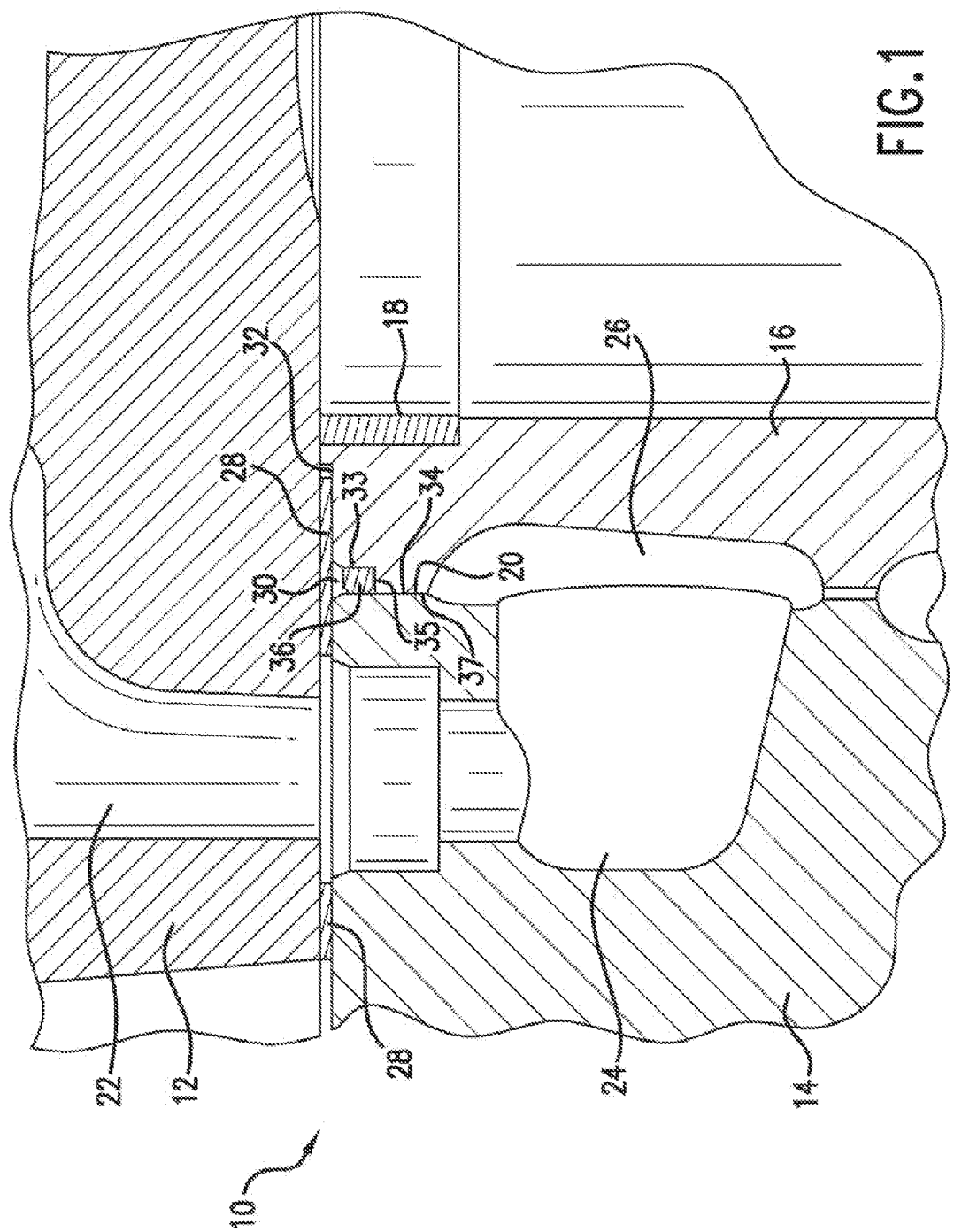
FIG. 1 is a cross-sectional view of an engine head assembly including the coolant seal.

With reference to FIG. 1, a portion of an internal combustion engine 10 is illustrated and includes a cylinder head 12 which overlies a cylinder block 14 and a cylinder liner 16. The cylinder liner 16 may include a scraper ring 18 in a conventional manner. The cylinder block 14 includes a plurality of cylinder bores 20 each of which receives a cylinder liner 16. Formed in both the cylinder head 12 and the cylinder block 14 are coolant passages 22 and 24 respectively, with the coolant passage 24 leading to a coolant chamber 26 which surrounds at least an upper portion of the cylinder liner 16. The cylinder block 14 and liner 16 are configured so as to permit the flow of coolant fluid about an outer periphery of the cylinder liner 16 to ensure that the cylinder liner 16 and cylinder block 14 are maintained within desired operating temperatures.

Positioned between the cylinder block 14 and the cylinder head 12 as well as between the cylinder liner 16 and the cylinder head 12 is one or more head gaskets 28. The head gasket 28 may be in the form of one continuous element or in the form of several elements. Preferably the head gasket is of a single element. This head gasket forms a combustion gas seal between the cylinder head 12 and cylinder block 14 and the cylinder head 12 and the cylinder liner 16. The head gasket 28 is generally provided to prevent gas and/or liquid leakage during engine operation; however, it may be desired to allow excess gases to escape during a natural gas intake manifold over-pressurization event.

As illustrated in FIG. 1, a circumferential cut-out 30 is formed in an upper surface 32 and a cylindrical side surface 34 of the cylinder liner 16. The circumferential cut-out 30 thus includes inner side wall 33 and a bottom wall 35. The specific configuration of the circumferential cut-out 30 will be explained in greater detail hereinbelow. Positioned within the circumferential cut-out 30 is a seal 36 which provides for an effective seal between the cylinder block 14 and the cylinder liner 16. While the seal 36 may take on a variety of configurations, the inventors have provided configurations which have been determined to provide the requisite sealing desired.

Figure 2:
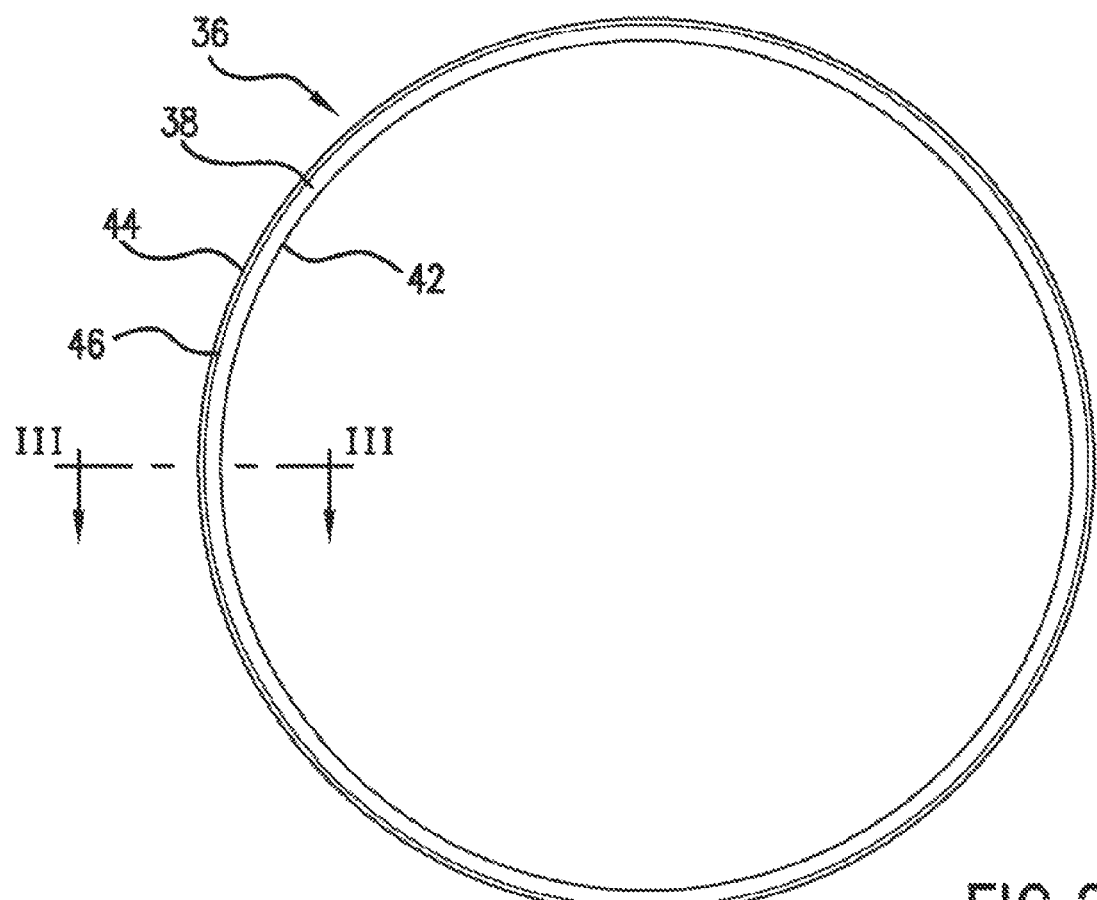
FIG. 2 illustrates the upper liner seal alone.
Figure 3:
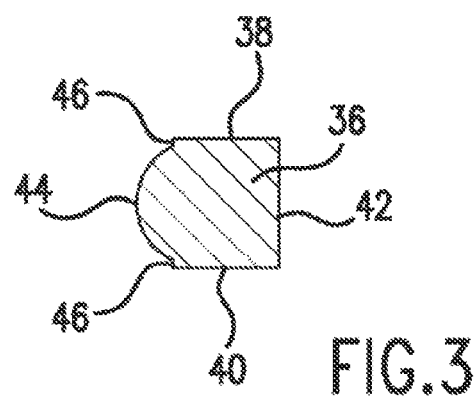
FIG. 3 is a cross-sectional view of the upper liner seal taken along line III-III of FIG. 2.

As illustrated in FIGS. 2 and 3, the seal is generally of a ring configuration so as to conform approximately to the outer dimension of the respective cylinder liner and the circumferential cut-out formed therein. As particularly illustrated in FIG. 3, the ring seal is substantially in the form of a "D" ring seal including substantially planar top and bottom surfaces 38, 40 as well as a cylindrical inner surface 42. Opposite the inner surface 42 is an arcuate outer surface 44, which may include indents 46 extending about the periphery of the "D" ring seal 36 which add to the structural stability of the "D" ring seal. Further, given the structure of the "D" ring seal, a technician can readily determine if the seal is twisted upon assembly. The "D" ring seal is configured to be of a thickness which is greater than the distance from the inner sidewall 33 of the circumferential cut-out 30 and the opposing surface 37 of the cylinder block 14, including any chamfered surface of the block. In doing so, the "D" ring seal 36 is squeezed into the circumferential cut-out 30 to maintain its position therein. Therefore, the "D" ring seal 36 is essentially crushed by the cylinder liner 16 and the cylinder block 14. The "D" ring seal 36 is generally not loaded by the cylinder head 12 or the cylinder head gasket 28. Thus, the "D" ring seal 36 keeps coolant from weeping upwards through the metal press fit between the cylinder liner 16 and cylinder block 14 and also prevents combustion gases or excess gases from a natural gas intake manifold over-pressurization event from mixing with the coolant. In doing so, possible corrosion of the cylinder block deck, as well as the cylinder head gasket 28 due to persistent leakage can be prevented. Also, and more importantly, pressurization or potential contamination of the engine coolant can be prevented.

Additionally, a possible outcome of an overpressure event within the engine may result in the head gasket allowing excess gases to escape by being pushed out from between the cylinder head and top of the liner. Shortly after this event, the cylinder pressure stops, but the engine cooling system retains pressure. This pressure difference may be sufficient to move the liner top sealing ring 36 upwards within the cut-out 30. Accordingly, to ensure that an adequate seal is maintained, the location of the widest part of the "D" of the D-ring seal 36 is such that even if the liner top sealing ring is pushed by coolant pressure all the way up against an undersurface of the cylinder head 12, sealing pressure between the liner and block bore is retained. This avoids a hot pressurized coolant spill to the outside of the engine. Therefore, it is preferred that the half-height of the "D" ring seal 36 be larger than a thickness of the head gasket, or space between the cylinder block 14 and cylinder head 12, plus a vertical dimension of the larger of the block or liner lead-in chamfers, referred to in detail hereinbelow. In doing so, should the "D" ring seal 36 be displaced upward in the event of over-pressurization, the top surface of the "D" ring seal 36 will contact the undersurface of the cylinder head 12 while the widest part of the "D" of the D-ring seal 36 maintains contact with the cylinder block 14, thereby maintaining a sufficient seal between the cylinder block 14 and the cylinder liner 16.

The "D" ring seal 36 is formed of an elastomeric material and preferably of a high temperature, coolant resistant elastomeric material. Materials which are particularly suitable for this purpose are tetrafluorethylene-propylene and peroxide cured fluorocarbon. Tetrafluoroethylene-propylene is resistant to temperatures in excess of 450° F., which is higher than that of peroxide cured fluorocarbon; however, such superiority comes at a cost. Therefore, in applications where temperatures less than 400° F. are experienced, the less expensive peroxide cured fluorocarbon is used.

As noted hereinabove, FIG. 4 generally illustrates a top plan view of the cylinder block 14 and cylinder liner 16. The cylinder block 14 includes various fluid paths as well as the cylinder liners 16. Further, the cylinder liners 16 include the scraper ring 18 and circumferential cut-out 30 as evidenced from the top view.

Figure 5:
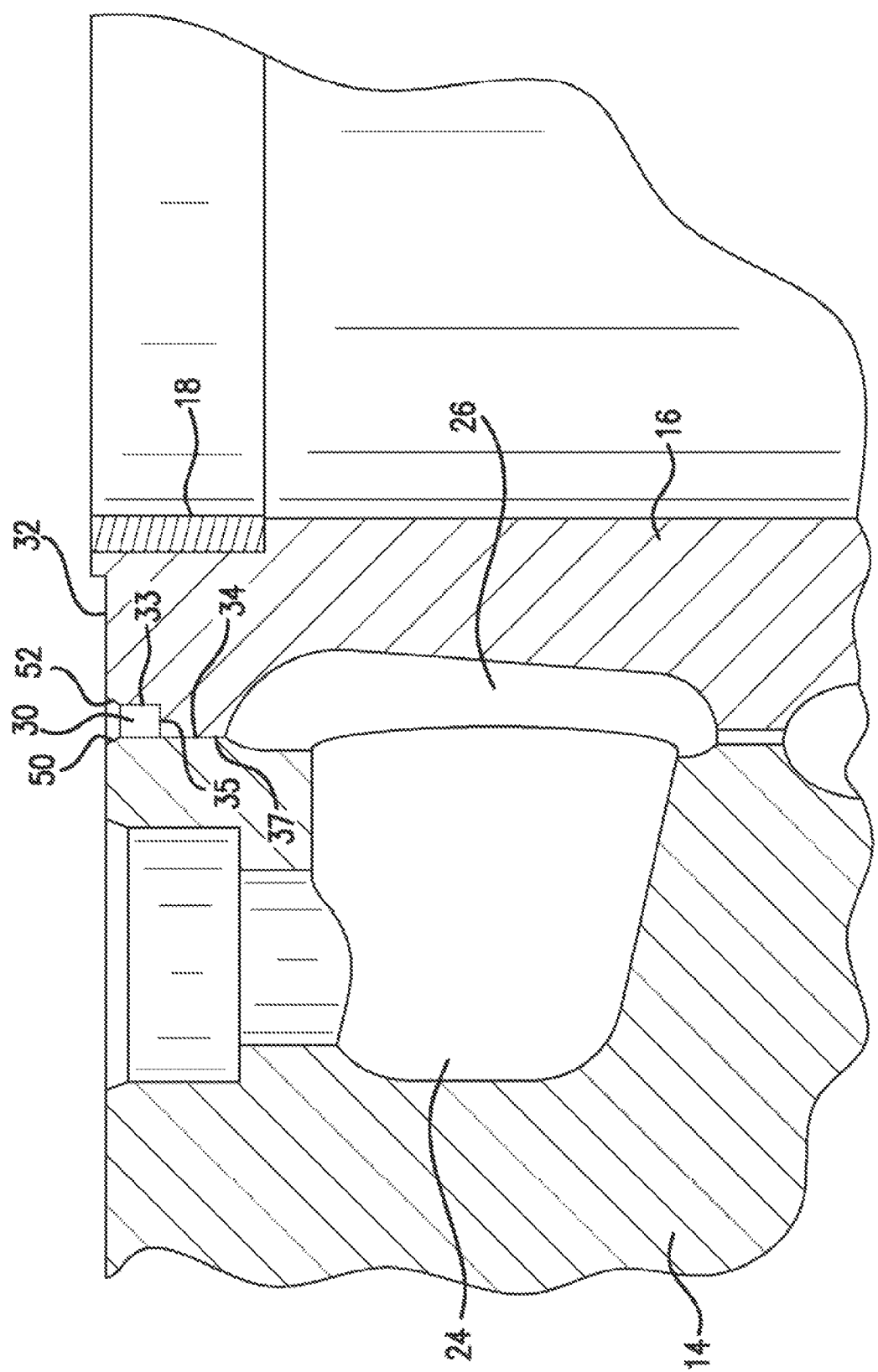
FIG. 5 is a cross-sectional view of the engine block of the engine head assembly having the engine head removed.
Figure 6:
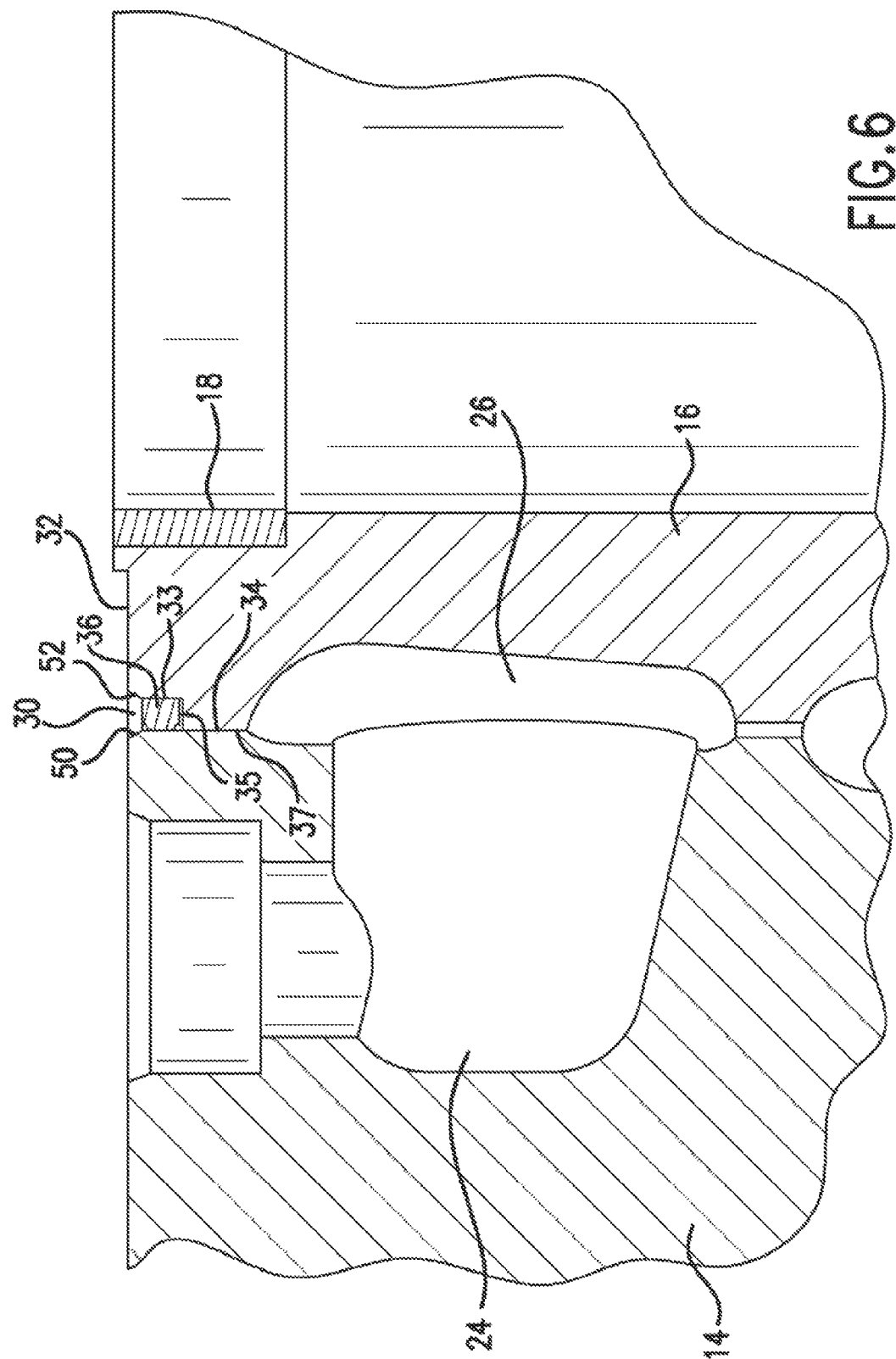
FIG. 6 is a cross-sectional view of the engine block of the engine head assembly having the engine head removed including the upper liner seal in place.
Figure 7:
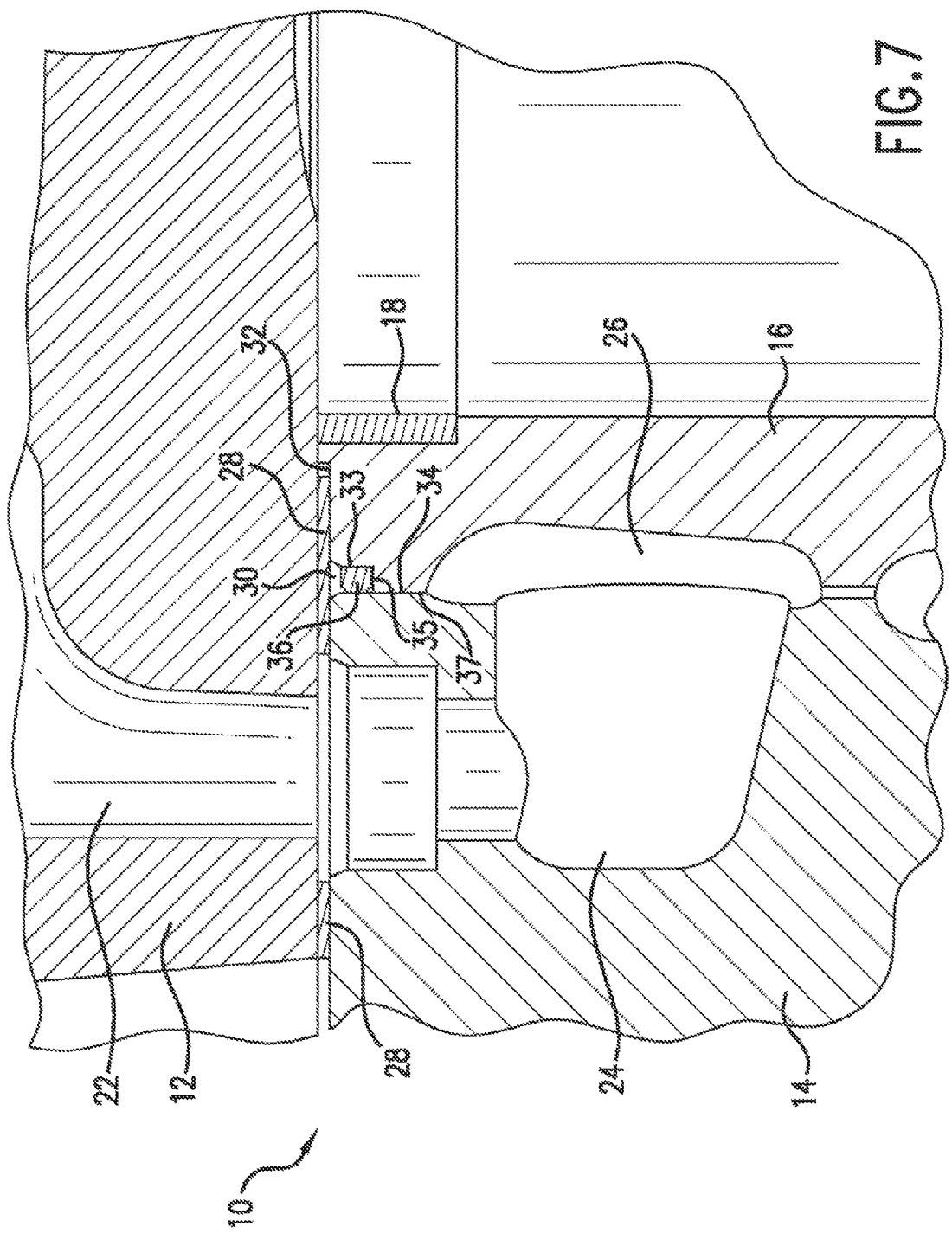
FIG. 7 is a cross-sectional view of the engine block of the engine head assembly having the upper liner seal in place and the head positioned thereon.

With reference to FIGS. 5-7, one aspect of the present invention will be explained in detail, namely, the replacement of the cylinder liner seal 36. As illustrated in FIG. 5, the cylinder head 12 and cylinder gasket 28 have been removed. Once removed, the cylinder liner seal 36 is likewise removed while maintaining the positioning of the cylinder liner 16 within the cylinder bore of the cylinder block 14. Particularly, the method of replacing the cylinder liner sealing arrangement includes removing the cylinder head 12 and head gasket 28 (if necessary) from the cylinder block 14 of the engine while maintaining the position of the cylinder liner 16 within their respective cylinder bore formed in the cylinder block 14. In that the cylinder liner has a substantially cylindrical upper outer surface 34 and a substantially planar top surface 32, the circumferential cut-out 30 formed in the substantially cylindrical upper outer surface 34 and the substantially planar top surface 32 of the cylinder liner 14 is readily accessible. The cylinder liner seal to be replaced is removed from within the circumferential cut-out 30 while maintaining the position of the cylinder liner 16 within the cylinder bore. Next, a replacement cylinder liner seal 36 is positioned in the circumferential cut-out 30, again while maintaining the position of the cylinder liner 16 within the respective cylinder bore as illustrated in FIG. 6. Following the positioning of the replacement cylinder liner seal 36 in the circumferential cut-out 30, the head gasket 28, if removed, is replaced and the cylinder head 12 is placed on the cylinder block 14 and secured thereto as illustrated in FIG. 7.

Figure 4:
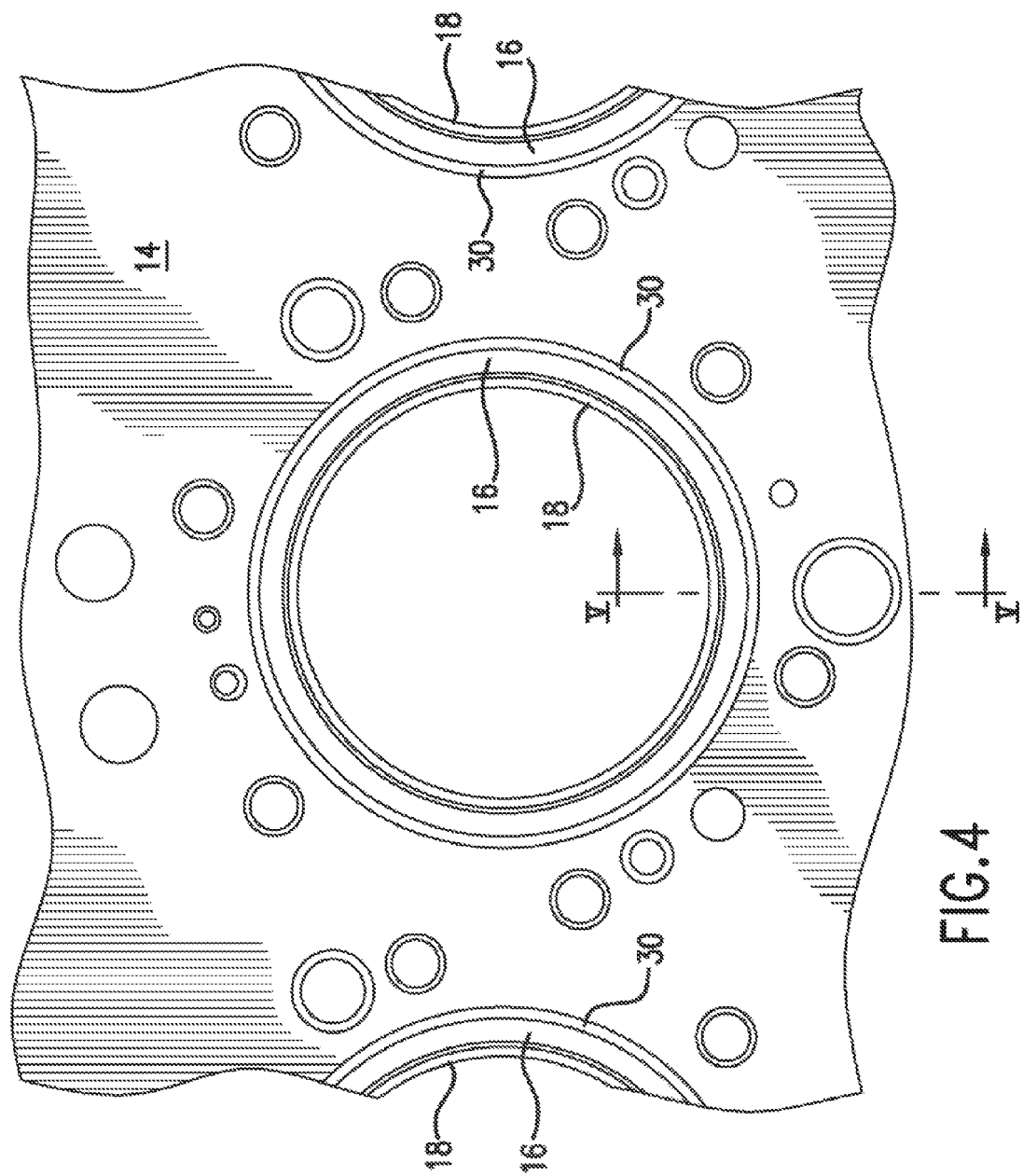
FIG. 4 is a top view of the engine block of the engine head assembly having the engine head removed.

As shown in FIGS. 4-6, the circumferential cut-out 30 includes chamfered circumferential upper edges. Upper circumferential edge 50 of the cylinder block 14 and upper circumferential edge 52 of the cylinder liner are chamfered away from one another to aid in the positioning of the cylinder liner seal within the circumferential cut-out 30. While the angle of the chamfer may vary, this angle is generally on the order of 30° from the inner surface of the circumferential cut-out and the inner surface of the bore of the cylinder block 14. Further, the dimensioning of the circumferential cut-out 30 and the cylinder seal 36 are dependent on engine size and overall capacity. However, as noted hereinabove, the cylinder liner seal 36 is of a greater radial diameter than the circumferential cut-out 30 to ensure the compression fit of the cylinder liner seal 36 between the inner sidewall 33 circumferential cut-out and the opposing surface 37 of the cylinder block 14.

Figure 8:
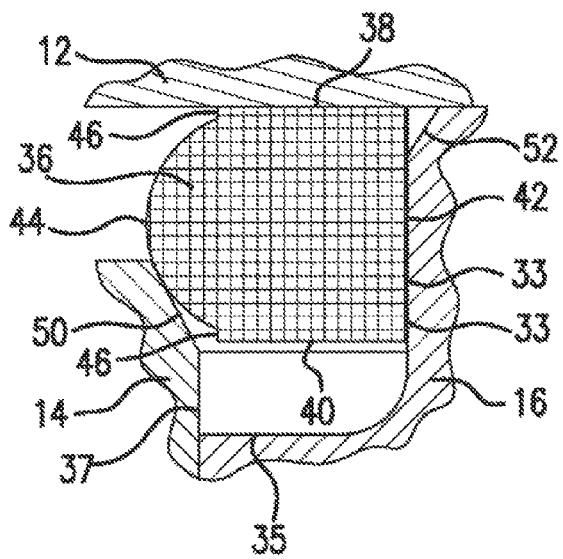
FIG. 8 is a schematic view of the upper liner seal being positioned during assembly.
Figure 9:
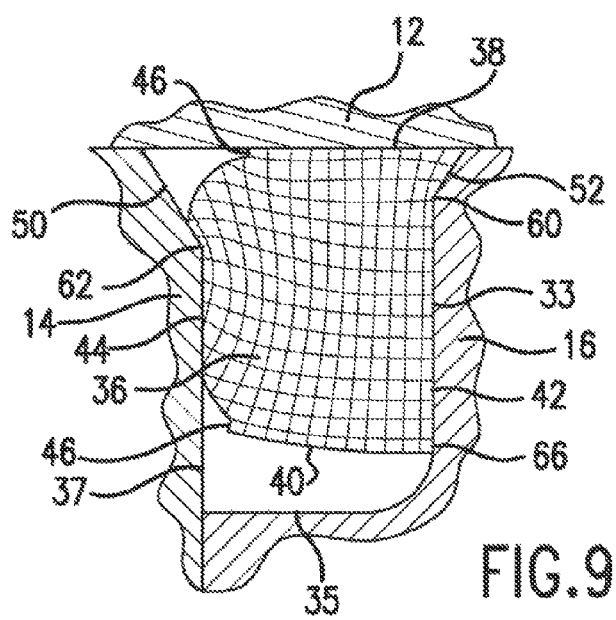
FIG. 9 is a schematic view of the upper liner seal being positioned during assembly.
Figure 10:
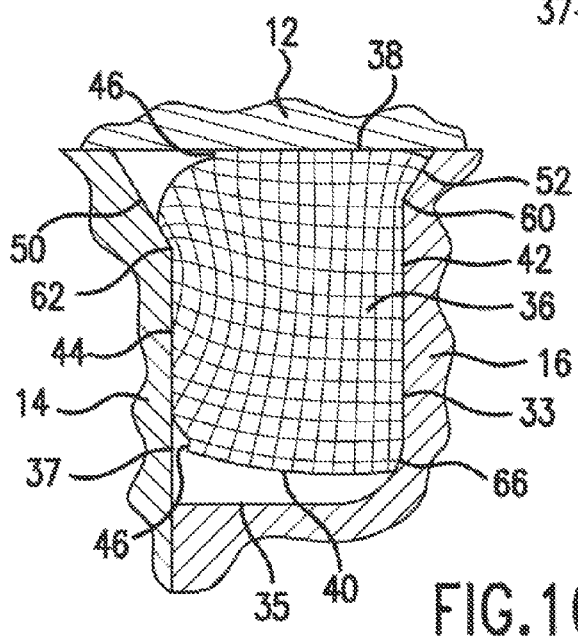
FIG. 10 is a schematic view of the upper liner seal under operating conditions.

While the foregoing discussion focuses on the replacement of cylinder liner seal 36, FIGS. 8-10 illustrate the initial positioning of the cylinder liner seal 36 within the respective circumferential cut-out 30. During factory installation of the cylinder liner seal 36, the cylinder liner seal 36 is provided on the cylinder liner 16 and positioned in what is to be the circumferential cut-out 30. The plurality of cylinder liners 16 are placed in their respective bore within the cylinder block 14 and the cylinder head 12 including a head gasket is placed on and in contact with the respective cylinder liners 16, as illustrated in FIG. 8. For purposes of clarity, the head gasket is not illustrated in FIGS. 8-10.

Figure 11:
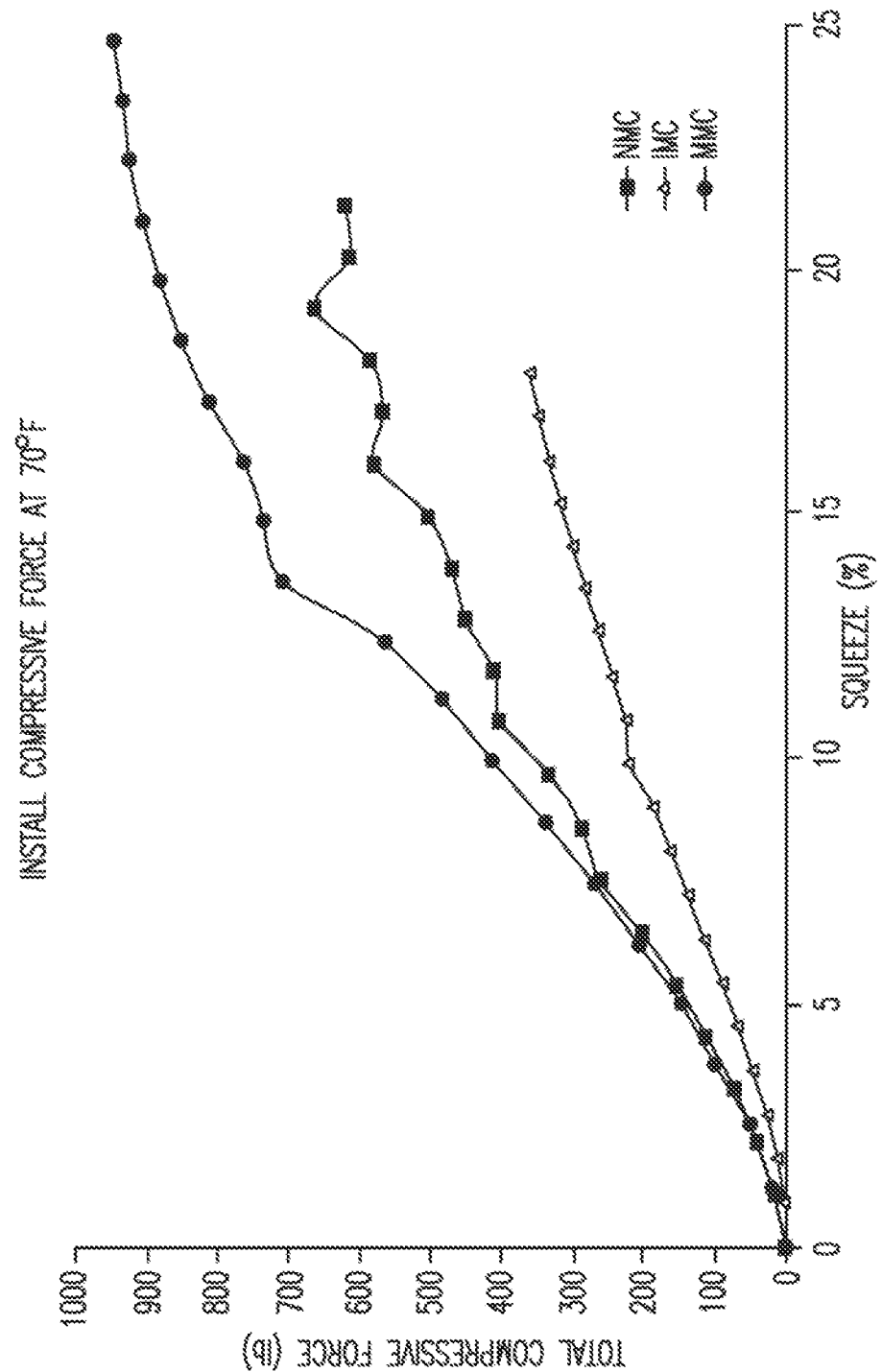
FIG. 11 is a graphical illustration of the upper liner seal installation compressive forces.
Figure 12:
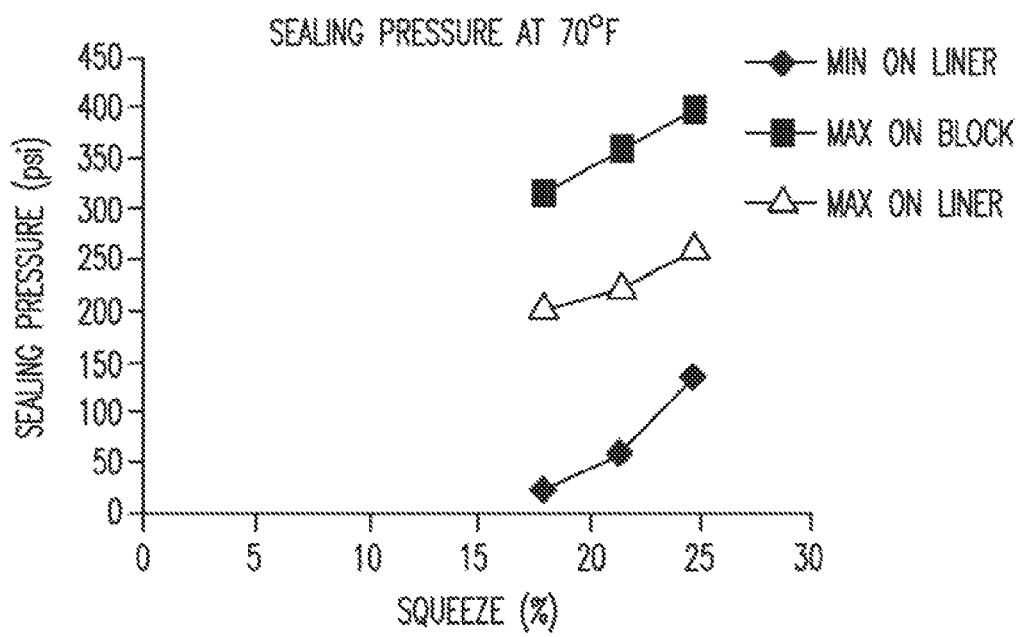
FIG. 12 is a graphical illustration of the upper liner seal sealing pressure at 70° F.
Figure 13:
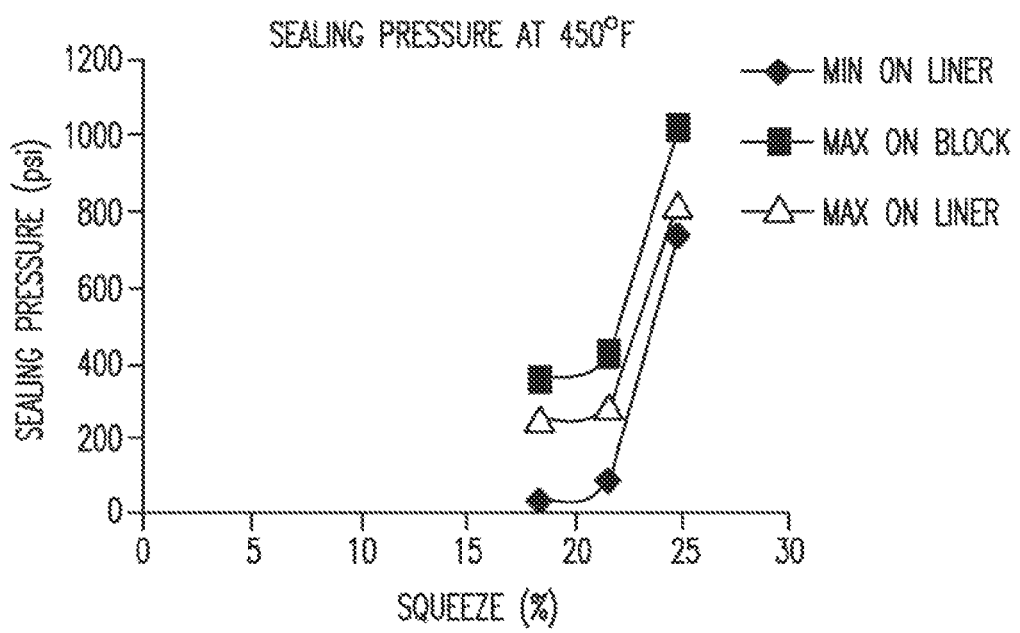
FIG. 13 is a graphical illustration of the upper liner seal sealing pressure at 450° F.

As the cylinder head 12 is moved toward the cylinder block 14 and the cylinder liner 16 including the cylinder liner seal 36 are moved further into the cylinder bore, contact pressures or sealing pressures are generated against the cylinder liner seal 36 as illustrated in FIG. 9. These pressures have been determined as being greatest at the intersection of the bevels and the inner side wall 33 and the opposing surface 37, regions 60 and 62 respectively. Further, as graphically illustrated in FIG. 11, during the installation at 70° F., as the cylinder liner seal 36 is squeezed within the circumferential cut-out 30, compressive forces are increased. Also, the sealing pressures generated during installation at 70° F. are graphically illustrated in FIG. 12. At operating temperatures of about 450° F. the sealing pressures become greater as illustrated in FIG. 13. FIG. 10 illustrates the seal in place during operating conditions of approximately 450° F. The minimum sealing pressure on the cylinder liner 16 is experienced in the lowermost region 66 of the cylinder liner seal 36.

Figure 14:
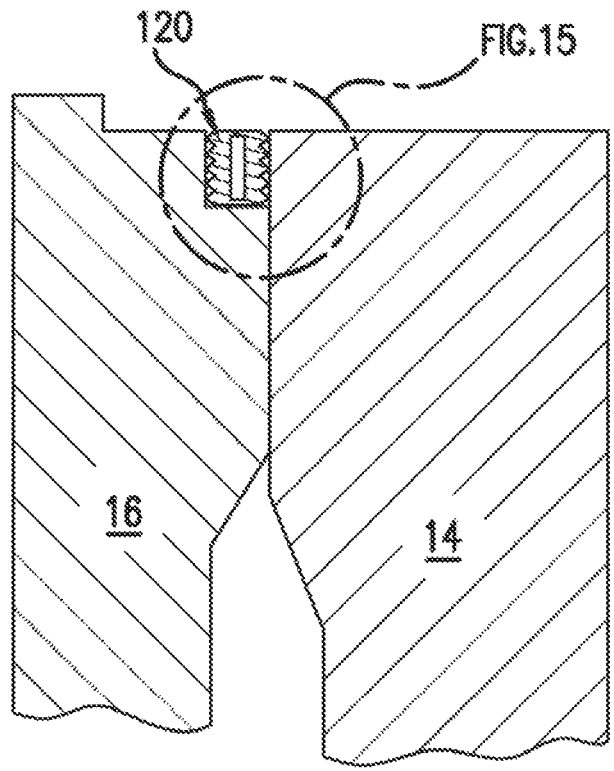
FIG. 14 is a cross-sectional view of an alternative upper liner sealing arrangement.
Figure 15:
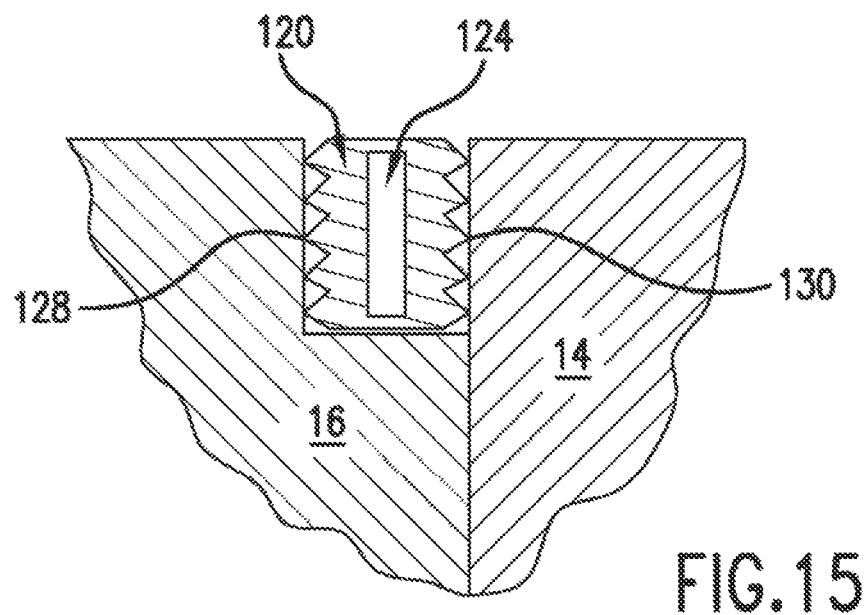
FIG. 15 is an exploded view of the upper liner sealing arrangement shown in FIG. 14.

As an alternative to the foregoing, FIGS. 14 and 15 illustrate a press in place cylinder liner sealing 110 which is positioned around the top periphery of the removable cylinder liner 116 received in the cylinder block 114 of an internal combustion engine. The cylinder liner sealing ring 110 illustrated in detail in FIG. 15 is of an elastomeric material 120 similar to that described above and having a metallic core 124 encapsulated by and bonded to the elastomeric material 120. The metallic core may be of any suitable metal including but not limited to steel. The cylinder liner seal is in the form of a ring and includes a plurality of circumferentially extending ribs 128, 130 formed in one of or both the inner and outer surfaces of the ring, respectively. The metallic core is used to maintain the structural integrity of the seal during the seals insertion as well as the seals use.

Particularly, the inclusion of the metallic core 124 in the cylinder liner sealing ring 110 of FIGS. 14 and 15, provides increased robustness against the possibility of a hot pressurized coolant spill to the outside of the engine. Specifically, if the head gasket is compromised by an overpressure event, it is generally only compromised in local areas about an upper portion of the cylinder liner. In the case of an all-rubber liner top sealing ring, this local loss of the head gasket may allow the liner top sealing ring in that area to move up against the cylinder head possibly resulting in a leakage of coolant outside the engine. With the inclusion of the metallic core 124 in the cylinder liner sealing ring 110, the continuing presence of the head gasket around the majority of the circumference of the top of the cylinder liner 116 serves to hold the entire metal-cored cylinder liner sealing ring 110 in its intended location in that the metal core has sufficient stiffness to hold down the cylinder liner sealing ring 110 against coolant pressures, even in areas that are no longer covered by the head gasket, thereby preventing movement of the cylinder liner sealing ring 110 and any leakage of coolant outside of the engine.

As noted, the cylinder liner seal has several commercial and strategic advantages including improved service event intervals by allowing the seal to be replaced when a head gasket is replaced, thus preventing the need to remove the cylinder liners to replace a radial o-ring seal when used. Further, greater flexibility in head gasket material is realized it that there is no longer a need for creating a micro-seal.

While the invention has been described by reference to various specific embodiments it should be understood that numerous changes may be made within the spirit and scope of the inventive concepts described, accordingly, it is intended that the invention not be limited to the described embodiments but will have full scope defined by the language of the following claims.

What is claimed is:

1. A cylinder liner sealing arrangement for an internal combustion engine, comprising:
   a cylinder block including a cylinder bore, the cylinder bore having an upper bore inner surface;
   a cylinder head, the cylinder head being rigidly attached to the cylinder block;
   a cylinder liner within the cylinder bore, the cylinder liner having a cylindrical upper outer surface and a planar top surface;
   a circumferential cut-out having a first sidewall and a bottom wall extending from the first sidewall toward a joint between the upper bore inner surface and the cylindrical upper outer surface of the cylinder liner, wherein an upper portion of the first side wall is beveled; and
   an upper liner seal positioned in the circumferential cut-out, the upper liner seal forming a coolant seal between the cylinder block and the cylinder liner.

2. The cylinder liner sealing arrangement of claim 1, the upper liner seal including a metallic core, wherein the metallic core is encapsulated by and bonded to an elastomeric material.

3. The cylinder liner sealing arrangement of claim 1, wherein the upper liner seal comprises an upper surface and a lower surface and a widest portion intermediate the upper surface and the lower surface, the widest portion configured to contact the cut-out below the beveled upper portion of the first sidewall to ensure the coolant seal is maintained even if the upper liner seal is pushed against an undersurface of the cylinder head by a fluid pressure.

4. The cylinder liner sealing arrangement of claim 1, wherein the upper liner seal comprises an elastomeric material.

5. The cylinder liner sealing arrangement of claim 4, wherein the elastomeric material is a high temperature coolant resistant elastomeric material.

6. The cylinder liner sealing arrangement of claim 4, wherein the upper liner seal comprises at least one of tetrafluorethylene-propylene and peroxide cured fluorocarbon.

7. The cylinder liner sealing arrangement of claim 1, the upper liner seal comprising a plurality of circumferentially extending ribs.

8. The cylinder liner sealing arrangement of claim 7, wherein the plurality of circumferentially extending ribs are formed in at least an outer circumferential surface of the upper liner seal.

9. The cylinder liner sealing arrangement of claim 7, wherein the plurality of circumferentially extending ribs are formed in an inner circumferential surface of the upper liner seal.

10. A method of replacing a cylinder liner sealing arrangement in an internal combustion engine, comprising:
    removing a cylinder head from a cylinder block of the engine, the cylinder block having at least one cylinder bore;
    removing a head gasket from the cylinder block of the engine;
    maintaining a position of a cylinder liner within the at least one cylinder bore formed in the cylinder block, the cylinder liner having a cylindrical upper outer surface and a planar top;
    removing an upper liner seal from within a circumferential cut-out while maintaining the position of the cylinder liner within the at least one cylinder bore;
    positioning a replacement upper liner seal in the circumferential cut-out while maintaining the position of the cylinder liner within the at least one cylinder bore, the circumferential cut-out and the upper liner seal forming a coolant seal between the cylinder block and the cylinder liner; and
    replacing the cylinder head on the cylinder block of the engine.

11. The method of replacing a cylinder liner sealing arrangement according to claim 10,
    wherein the circumferential cut-out includes a first sidewall formed in the cylindrical upper outer surface of the cylinder liner and a radially extending bottom wall extending from the first side wall toward the cylinder block and an upper inner surface of the at least one bore forms a second sidewall; and
    wherein the positioning of a replacement upper liner seal in the circumferential cut-out while maintaining the position of the cylinder liner within the at least one cylinder bore includes ensuring contact of the replacement upper liner seal with the first sidewall and the second sidewall.

12. The method of replacing a cylinder liner sealing arrangement according to claim 10, wherein at least one of the upper liner seal and the replacement upper liner seal comprises a plurality of circumferentially extending ribs.

13. The method of replacing a cylinder liner sealing arrangement according to claim 12, wherein the plurality of circumferentially extending ribs are formed in at least an outer circumferential surface of the at least one of the upper liner seal and the replacement upper liner seal, the plurality of circumferentially extending ribs being positioned in contact with the cylinder block.

14. The method of replacing a cylinder liner sealing arrangement according to claim 10, wherein at least one of the upper liner seal and the replacement upper liner seal comprises a metallic core.

15. The method of replacing a cylinder liner sealing arrangement according to claim 10, wherein the circumferential cut-out comprises a beveled upper edge, and wherein the upper liner seal comprises an upper surface and a lower surface and a widest portion intermediate the upper surface and the lower surface, and the widest portion is configured to contact the cylinder block and the cylinder liner to ensure the coolant seal is maintained even if the upper liner seal is pushed against an undersurface of the cylinder head by a fluid pressure.

16. The method of replacing a cylinder liner sealing arrangement according to claim 10, wherein the circumferential cut-out has a first sidewall and a bottom wall extending from the first sidewall toward a joint between the cylinder bore and the cylindrical upper outer surface of the cylinder liner, and wherein an upper portion of the first sidewall is beveled.

* * * * *